United States Patent
Wang

[11] Patent Number: 6,139,114
[45] Date of Patent: Oct. 31, 2000

[54] RIM DISC ADJUSTABLE TO DIFFERENT SIZED RIMS

[76] Inventor: Hung-Sheng Wang, P.O. Box 90, Tainan City, Taiwan

[21] Appl. No.: 09/288,814

[22] Filed: Apr. 9, 1999

[51] Int. Cl.⁷ .................................................. B60B 7/06
[52] U.S. Cl. ..................................... 301/37.33; 301/37.42
[58] Field of Search ................................ 301/37.1, 37.31, 301/37.32, 37.33, 37.42

[56] References Cited

U.S. PATENT DOCUMENTS

| 5,064,249 | 11/1991 | Hung | 301/37.42 |
| 5,161,860 | 11/1992 | Sakane | 301/37.42 |
| 5,700,062 | 12/1997 | Wang | 301/37.33 |
| 5,718,484 | 2/1998 | Sheu | 301/37.33 |
| 5,895,166 | 4/1999 | Tsai | 301/37.32 X |

*Primary Examiner*—Russell D. Stormer

[57] ABSTRACT

A rim disc adjustable to different sized rims includes a rim disc and a steel ring. The rim disc has a plurality of engagement members provided near an outer circumferential edge. Each engagement member has a projecting edge on a front end of an upper surface to rest on an inner wall of the rim, a ridge, a stop and a fit aperture for the steel ring to engage therein. One of the engagement member specially has another stop under the fit aperture, and the other stop has a few engagement grooves on its surface so that the steel ring may selectably fit in one of the engagement grooves to enable the rim disc to adjust to different sized rims.

1 Claim, 3 Drawing Sheets

RIM DISC ADJUSTABLE TO DIFFERENT SIZED RIMS

BACKGROUND OF THE INVENTION

This invention relates to a rim disc adjustable to different sized rims, particularly to one provided with a plurality of engagement members spaced apart around an outer circumferential edge for a steel ring to engage with all the engagement members to enable the rim disc to be adjustable to different sized rims by means of one of the engagement members provided with a few engagement grooves for the steel ring to selectively fit in one of the engagement grooves.

Conventional rims have different sizes according to the types of cars, and the rim discs have a single size to suit to only one kind of car, which are impossible to be used in different sized rims. If the rim is comparatively small, a rim disc may not be easily assembled with the rim. On the contrary, if the rim is comparatively large, a rim disc may be assembled with the rim, but hardly contact tightly the inner wall of the rim, and be liable to become loose, and fall off if worse.

SUMMARY OF THE INVENTION

This invention has been devised to offer a rim disc quickly and conveniently assembled with the rim.

The main feature of the invention is a plurality of engagement members provided spaced apart on a rim disc near its outer circumferential edge to rest on an inner wall of the rim, and one of the engagement members has a few engage grooves for a steel ring to selectably fit in so that the rim disc may adjust its size a little to suit different sized rims.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
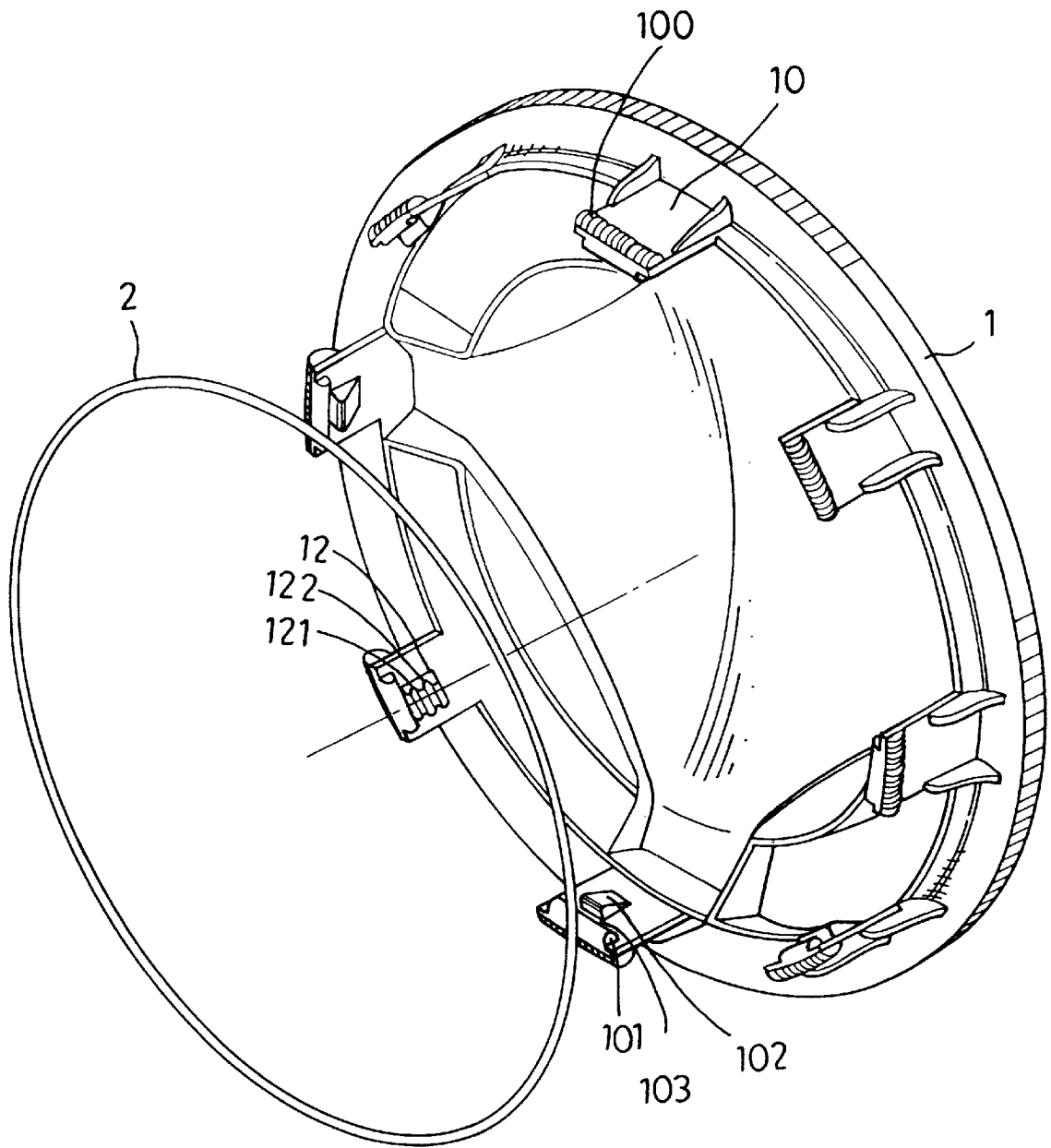
FIG. 1 is an exploded perspective view of a rim disc adjustable to different sized rims in the present invention.
Figure 2:
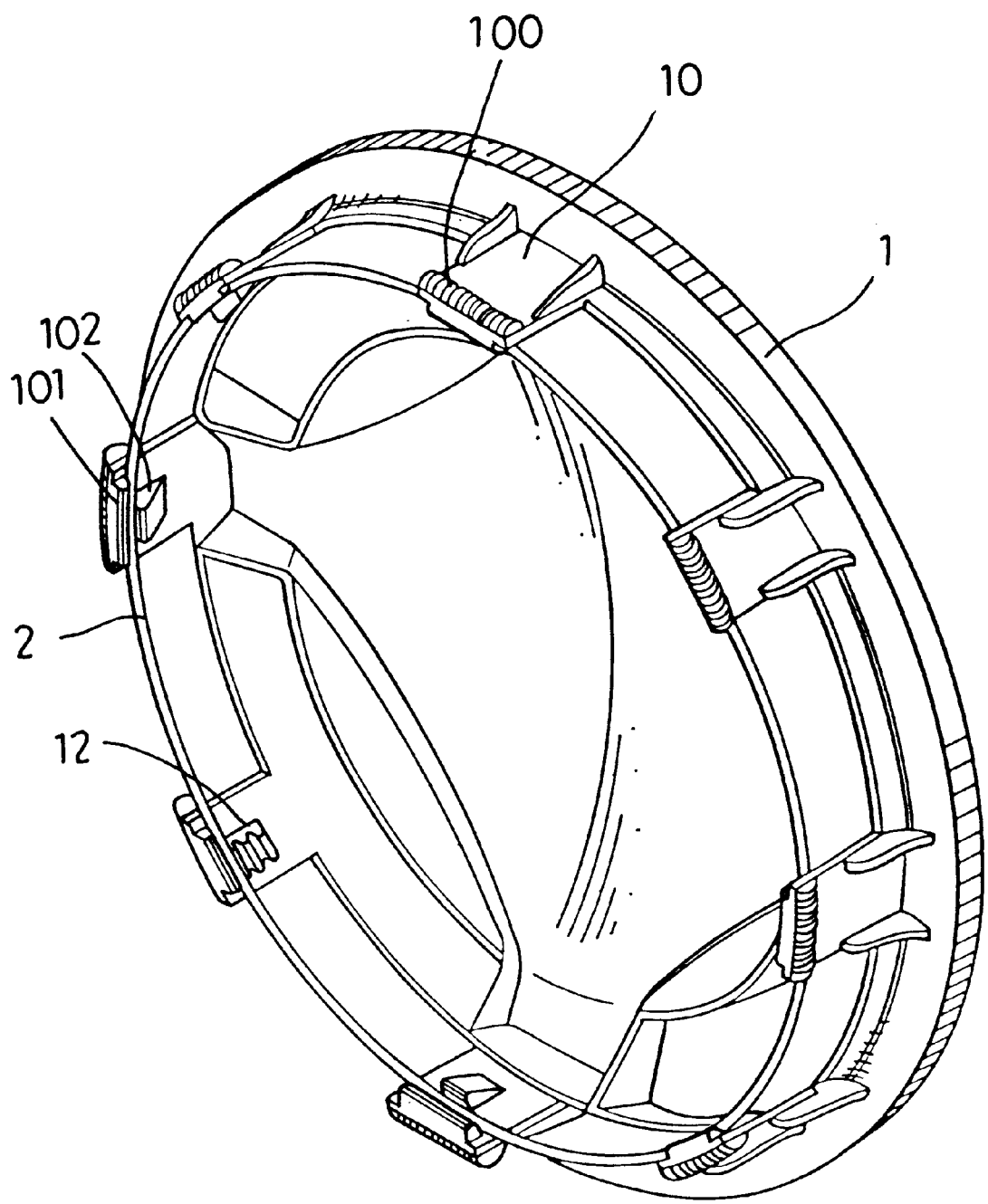
FIG. 2 is a perspective view of the rim disc adjustable to different sized rims in the present invention.

A preferred embodiment of a rim disc adjustable to different sized rims in the present invention, as shown in FIGS. 1 and 2 includes a rim disc 1 and a steel ring 2 combined together.

The rim disc 1 has a plurality of engagement members 10 formed spaced apart equidistantly around the circumferential edge. Each engagement member 10 has a projecting edge 100 on a front end of an upper surface to engage the inner wall of a rim, a ridge 101, a stop 102 and a fit aperture 103 formed in an inner side, for combining with the steel ring 2. Further, one of the engagement members 10 has another stop 12 formed in a lower surface under the ridge 101 and the fit aperture 103, and a few straight grooves 121, 122 provided on the outer surface of the other stop 12 for the steel ring 2 to engage in one of the straight grooves 121, 122 in stabilized condition.

Figure 3:
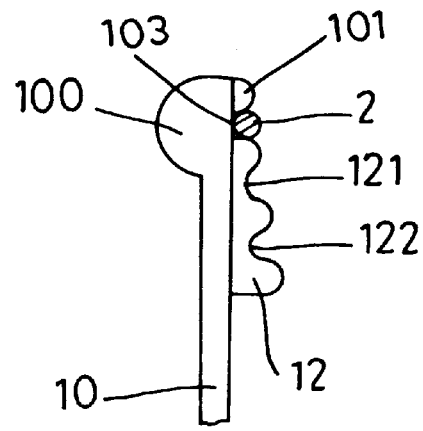
FIG. 3 is a side view of an engagement member of a stop engaging a steel ring in the present invention; and, FIG. 4 is a side view of the engagement member of a stop engaging and inclined forward by the steel ring in the present invention.
Figure 4:
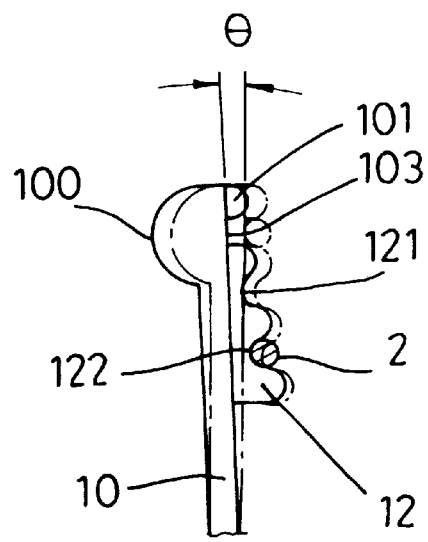

In assembling for use, referring to FIGS. 2, 3 and 4, the steel ring 2 is fitted in the fit aperture 103, and positioned by the ridge 101 and the stop 102 of all the engagement members 10 for common sized rims. If it is to be combined with a different sized rim, the position of the steel ring 2 is adjusted according to the size of the rim by moving the section of the steel ring 2 fitting in the fit aperture 103 downward to fit in one of the straight grooves 121, 122 to adjust the angle θ formed by all the engagement members 10 extending out, as shown in FIG. 4. For example, if the rim is comparatively large, then the ring 2 is moved down to the lower one of the straight grooves 121, 122 and secured in that position. Meanwhile, the ring 2 also expands outward all the engagement members 10, making the most expanded angle, as shown in FIG. 4. Thus, provision of the engagement members 10 enables the rim disc 1 adjusted to different size of the rim and secured stabilized quickly.

While the preferred embodiment of the invention has been described above, it will be recognized and understood that various modifications may be made therein and the appended claims are intended to cover all such modifications which may fall within the spirit and scope of the invention.

What is claimed is:

1. A rim disc adjustable to different sized rims comprising a rim disc and a steel ring, said rim disc having a plurality of engagement members provided equidistantly spaced apart near an outer circumferential edge of said disc, each engagement member having a projecting edge formed on a front end of an upper surface to engage an inner annular wall of said rim, and on the opposite surface from said projecting edge, a ridge, a first stop and an engagement aperture formed for said steel ring to engage therein; and characterized by one of said engagement members provided with a second stop formed under said ridge and said engagement aperture, said second stop having a few engagement grooves, said steel ring selectively engaging with one of said engagement grooves so that an expanded angle of said engagement member may change so as to permit said rim disc to be assembled quickly and securely with different sized rims.

* * * * *